United States Patent [19]
Matson

[11] Patent Number: 5,797,190
[45] Date of Patent: Aug. 25, 1998

[54] WHEEL ALIGNMENT METHOD AND APPARATUS

[76] Inventor: Kenneth N. Matson, 3786 Happy Valley Rd., Lafayette, Calif. 94549

[21] Appl. No.: 538,386

[22] Filed: Oct. 3, 1995

[51] Int. Cl.[6] ................................................ G01B 5/255
[52] U.S. Cl. ................................ 33/203.18; 33/203.15
[58] Field of Search .............................. 33/203, 203.12, 33/203.14, 203.15, 203.16, 203.17, 203.18, 203.19, 203.2, 203.21, 608

[56] References Cited

U.S. PATENT DOCUMENTS

| | | | |
|---|---|---|---|
| 2,737,728 | 3/1956 | Taber | 33/203.15 |
| 2,799,094 | 7/1957 | Taber | 33/203.15 |
| 3,758,958 | 9/1973 | Jordan | 33/203.15 |
| 3,805,399 | 4/1974 | Price | 33/203.18 |
| 4,800,651 | 1/1989 | Hanlon | 33/203.18 |
| 4,939,848 | 7/1990 | Armstrong | 33/608 |
| 4,958,439 | 9/1990 | Dehn | 33/608 |
| 5,179,784 | 1/1993 | Kowis | 33/203.18 |
| 5,408,755 | 4/1995 | Russell | 33/608 |

OTHER PUBLICATIONS

"Total Wheel Alignment Sourcebook," Specialty Products Company, Feb. 1992, pp. 4–5, 78–81.
"Wheel Alignment Instructions," Instructional pamphlet, Specialty Products Company, Undated.
"The A/T–4 Four Wheel Alignment Sustem," Altech Industries advertisement, in Bodyshop Expo '95, Feb./Mar. 1995.
"The Right Track (4–Wheel Alignment)," in Motor Age, Feb. 1995, p. 18 et seq.
"Wheel Alignment," in Petersen's Basic Chassis, Suspension & Brakes No. 2, 1971, pp. 48–59 no month.

*Primary Examiner*—G. Bradley Bennett
*Attorney, Agent, or Firm*—Elliot B. Aronson

[57] ABSTRACT

A wheel alignment system that uses the sidewall of the tire to define a measurement surface. The measurement surface is established by a wheel fixture that includes a pair of slide channels having flat faces that engage the sidewall of the tire and a base structure defining a planar measurement surface parallel to the sidewall that slides back and forth on the slide channels. A flexible strap is passed around the tire and attaches to the base structure at opposite sides to hold the fixture against the sidewall. A method is described for measuring the caster and steering axis inclination while the vehicle is jacked up. Another form of apparatus used for checking wheel straightness and for making toe measurements includes a cross member long enough to extend at least across the tire and engage the sidewall on opposite sides of the wheel. The cross member is supported on a pair of parallel rods that extend perpendicular to the cross member. This apparatus is used to observe deviations in the trueness as the tire is rotated. A wheel spreader apparatus includes a long shaft, a retractable tip for engaging a wall of a tire, and a spring biasing arrangement at one end of the shaft for urging the tip against the tire wall. The shaft carries a movable stop member that may be positioned at any point along the shaft, and the stop member carries a second tip for engaging an inner wall of an opposing tire. The wheel spreader reaches across the vehicle and extends beyond the opposite side so that it may be installed from the side of the vehicle.

9 Claims, 11 Drawing Sheets

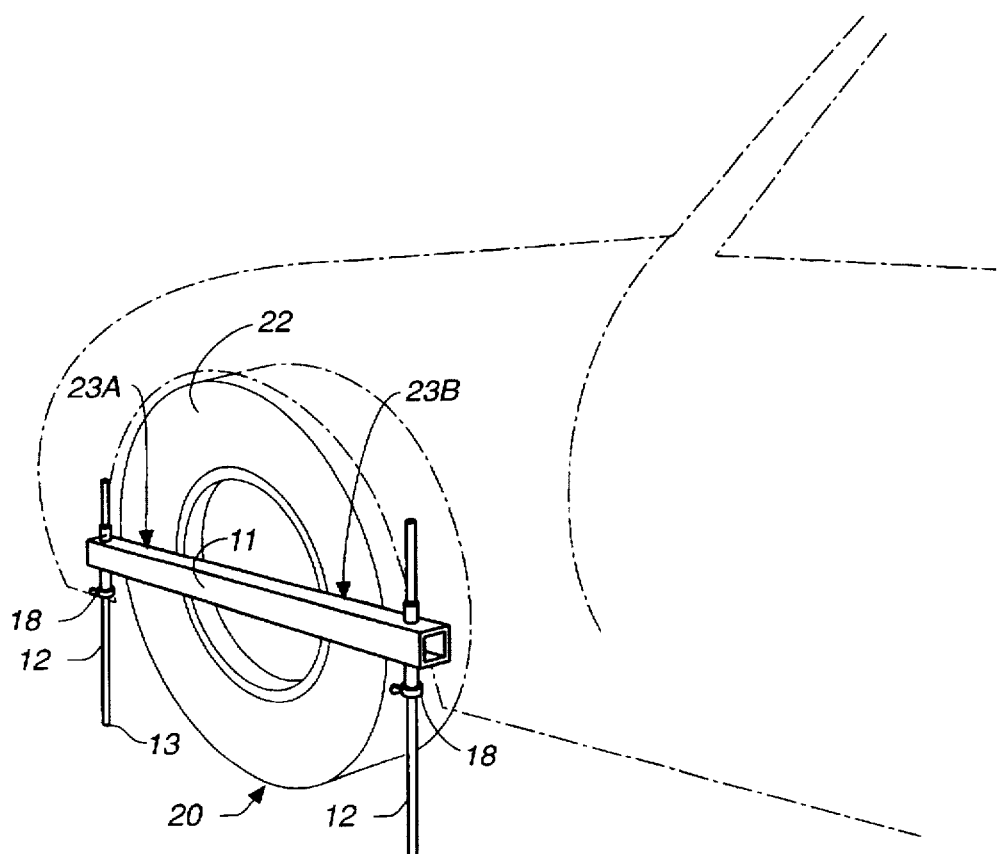
FIG._1
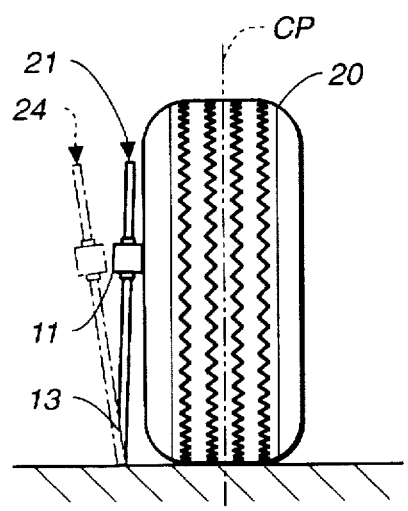
FIG._2
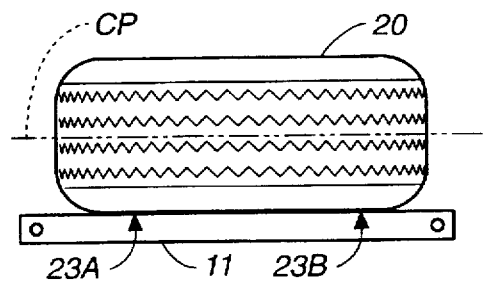
FIG._3A
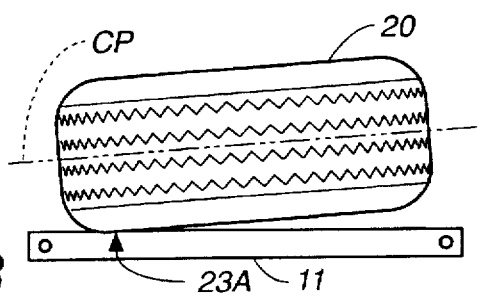
FIG._3B

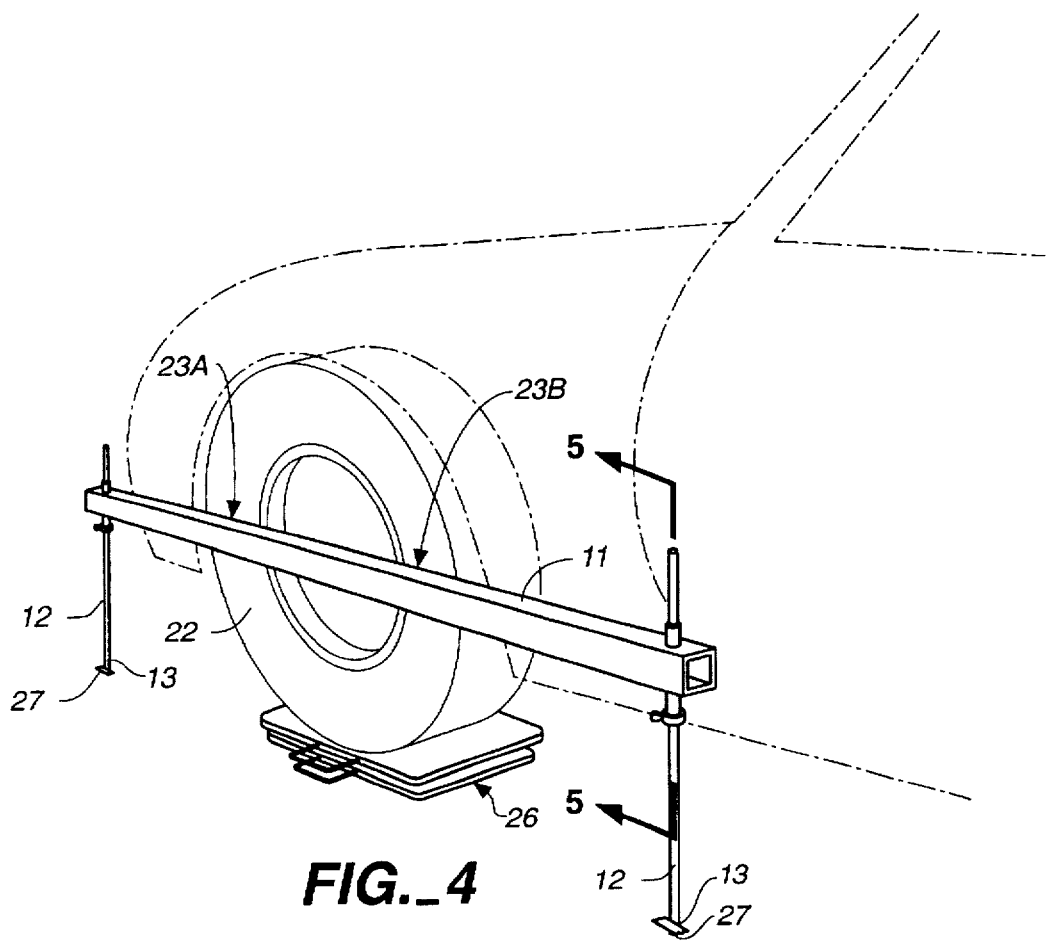
FIG._4
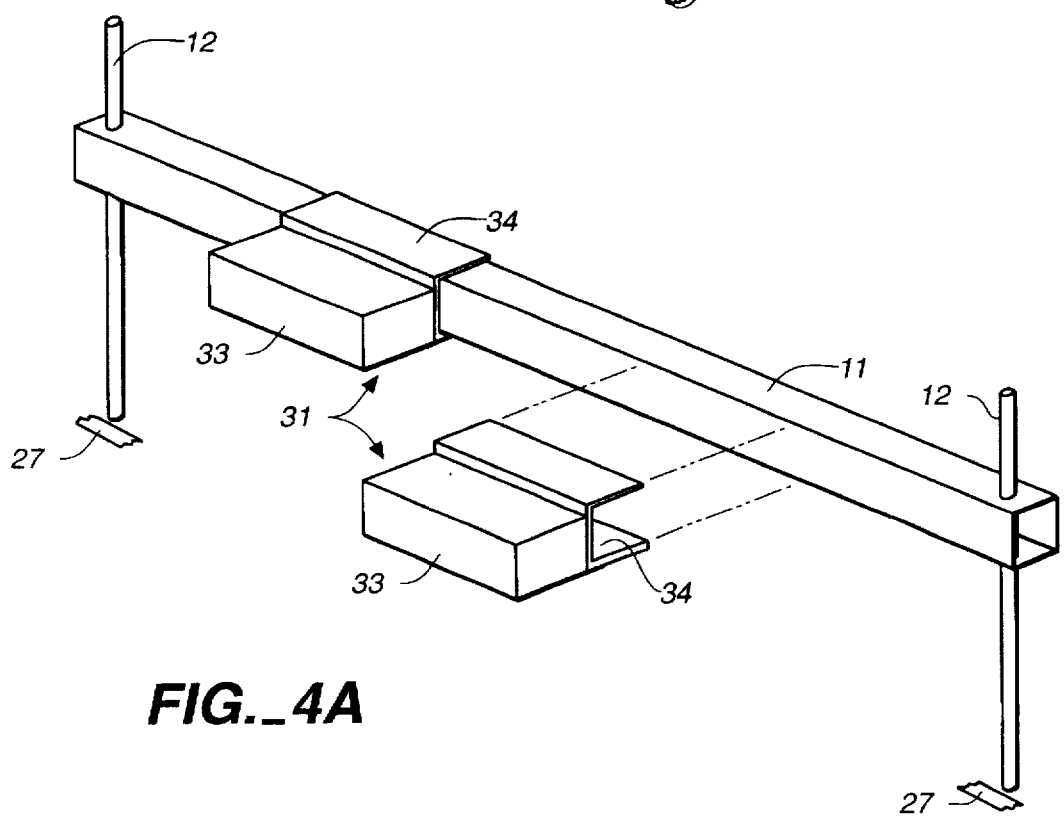
FIG._4A

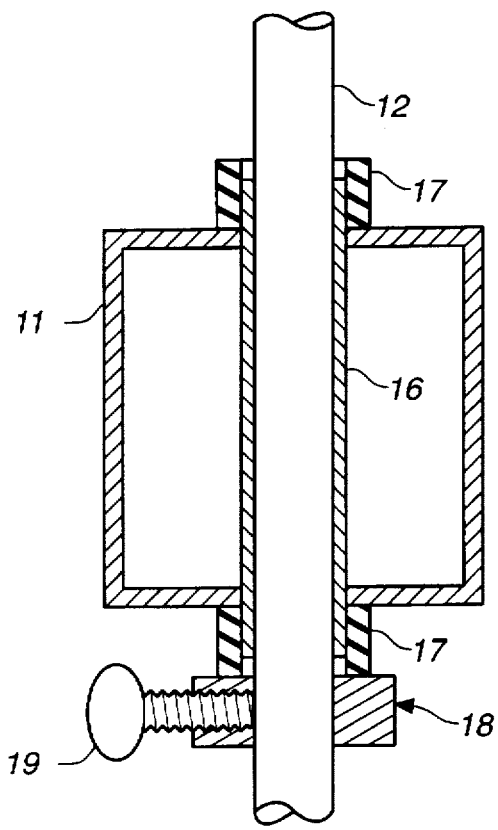
FIG._5
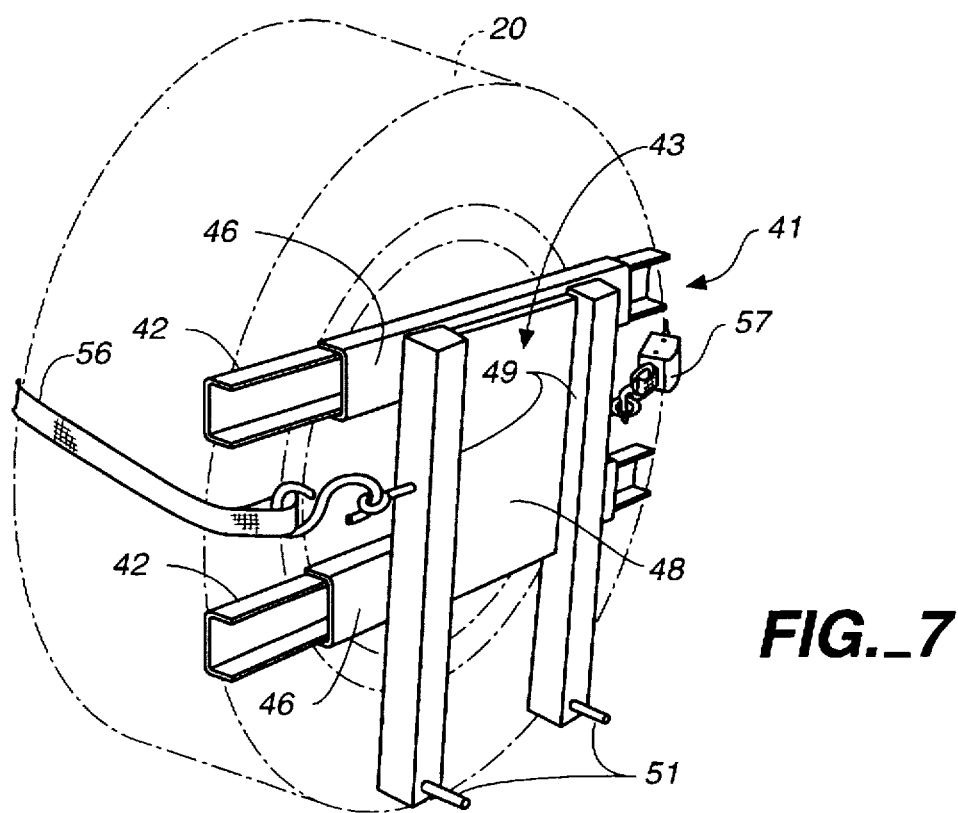
FIG._7

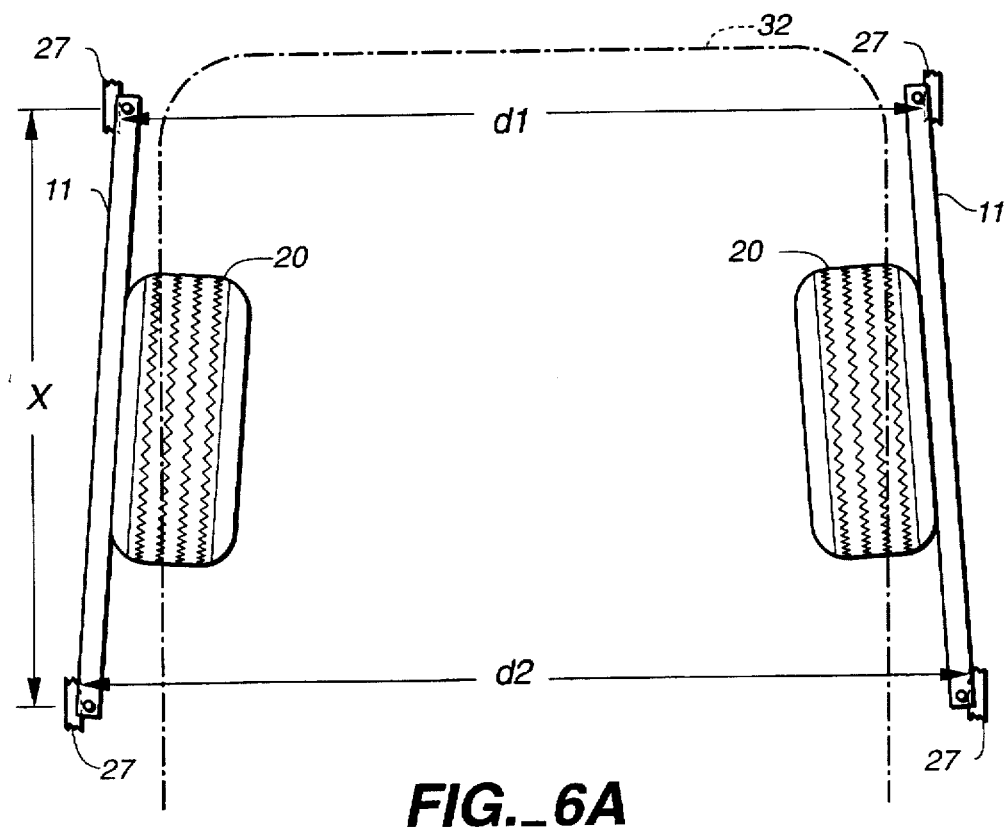
FIG._6A
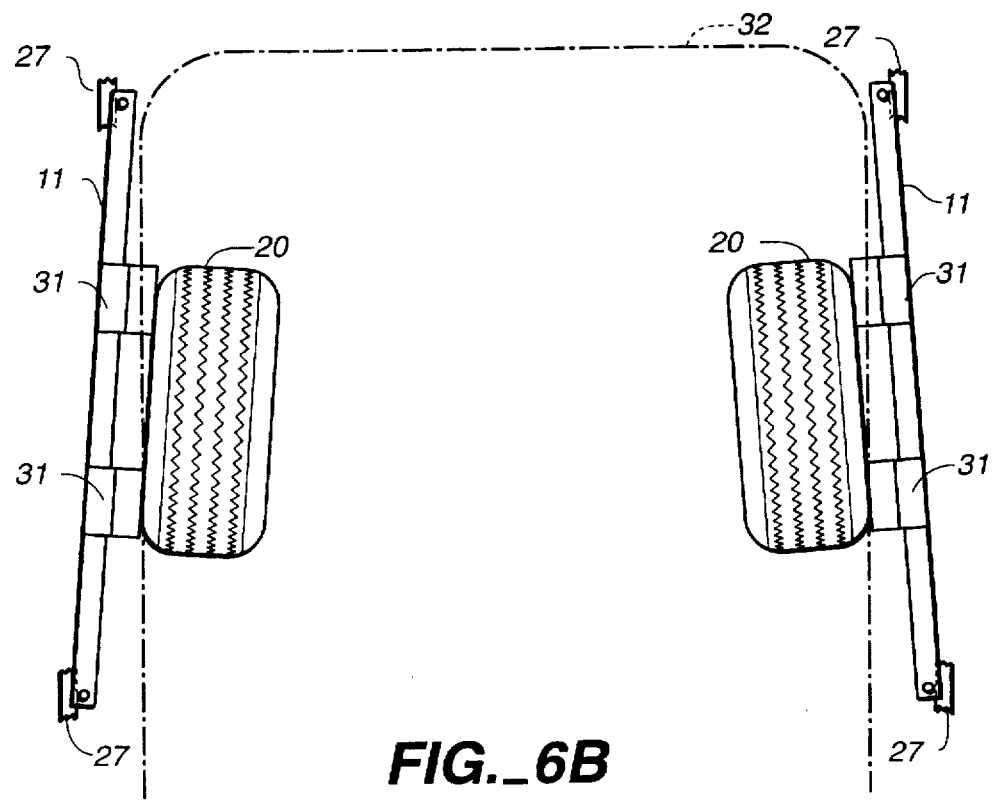
FIG._6B

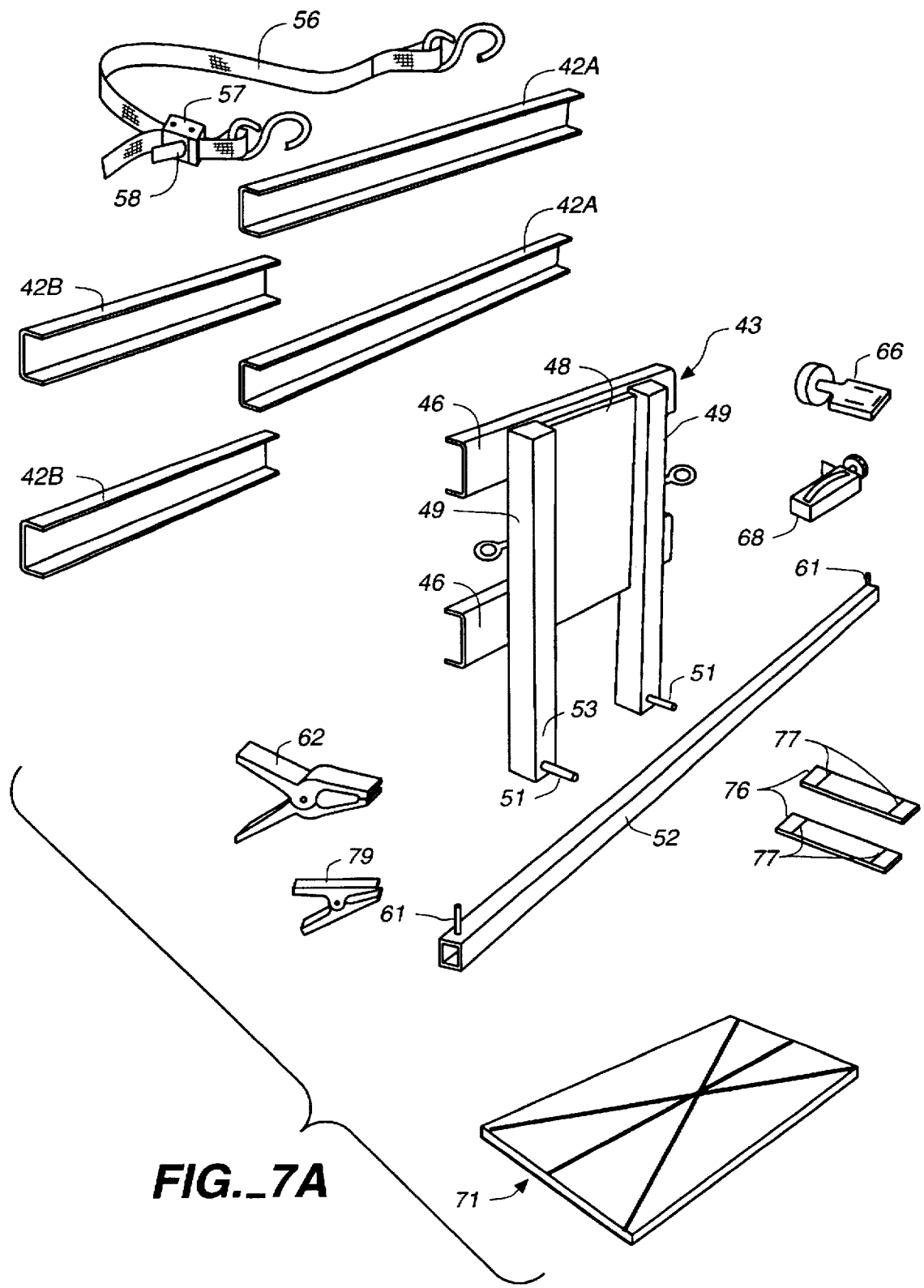
FIG._7A

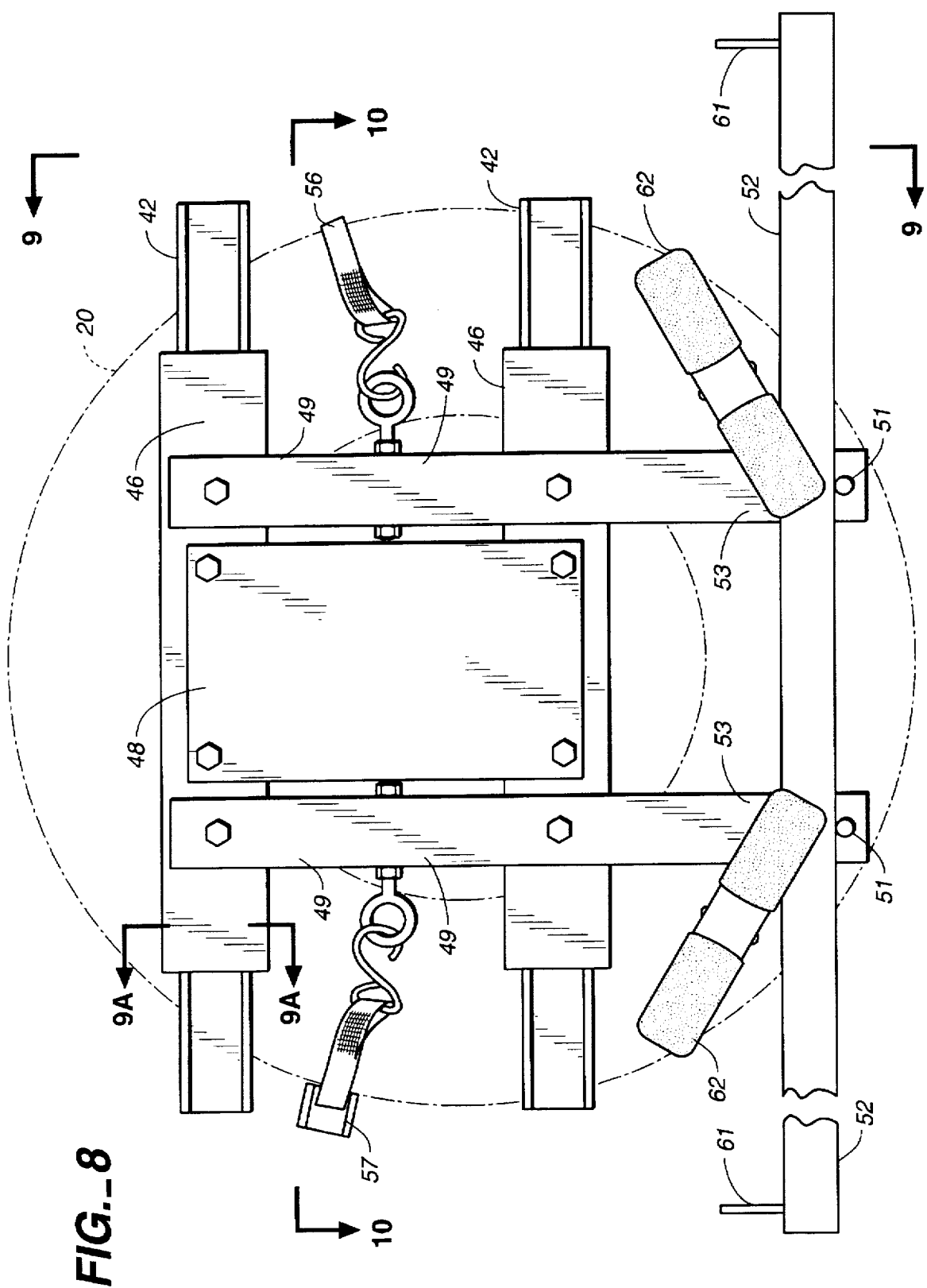
FIG._8

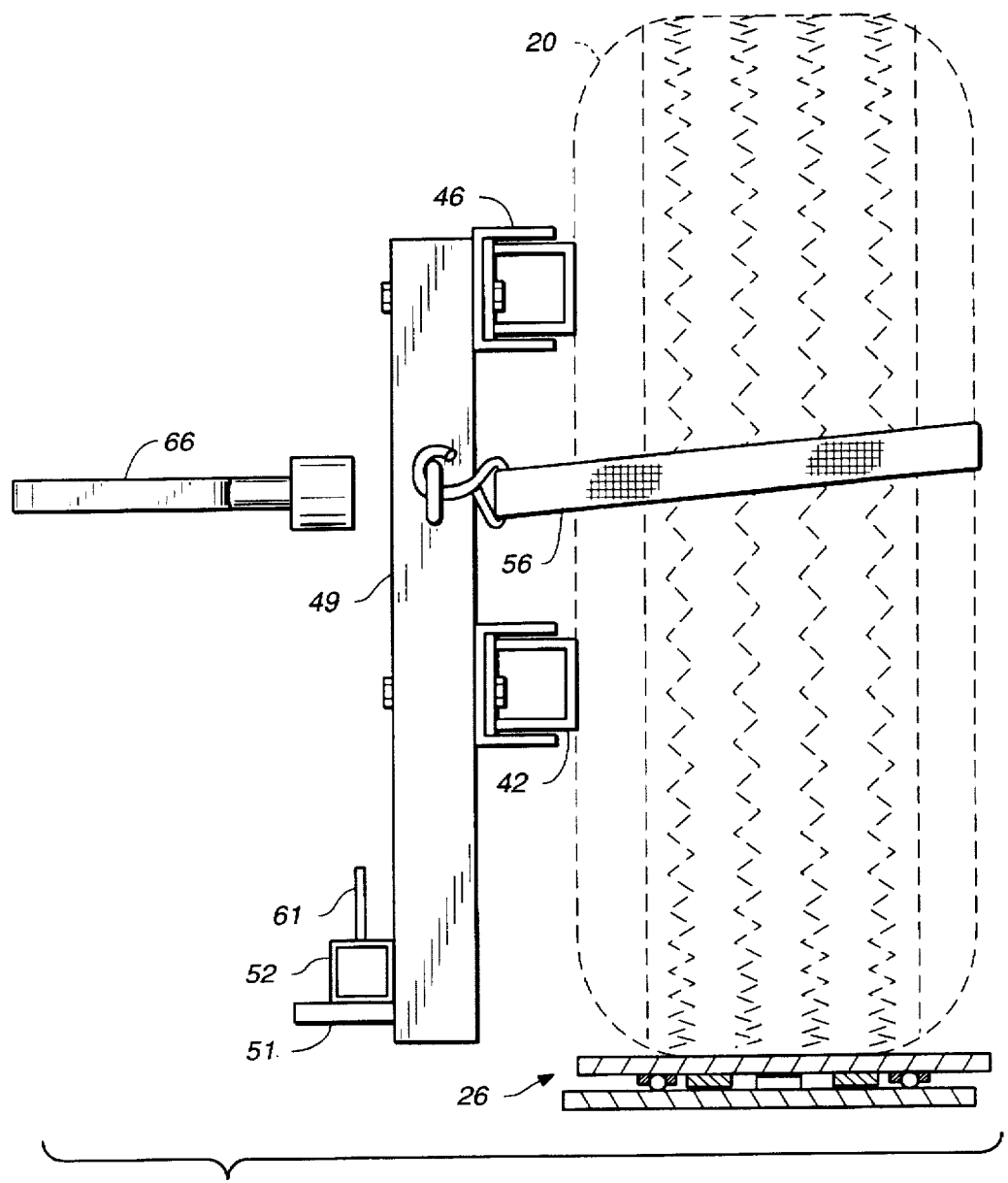
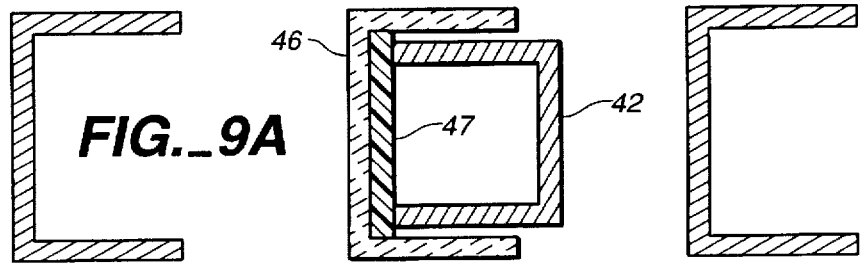
FIG._9
FIG._9A

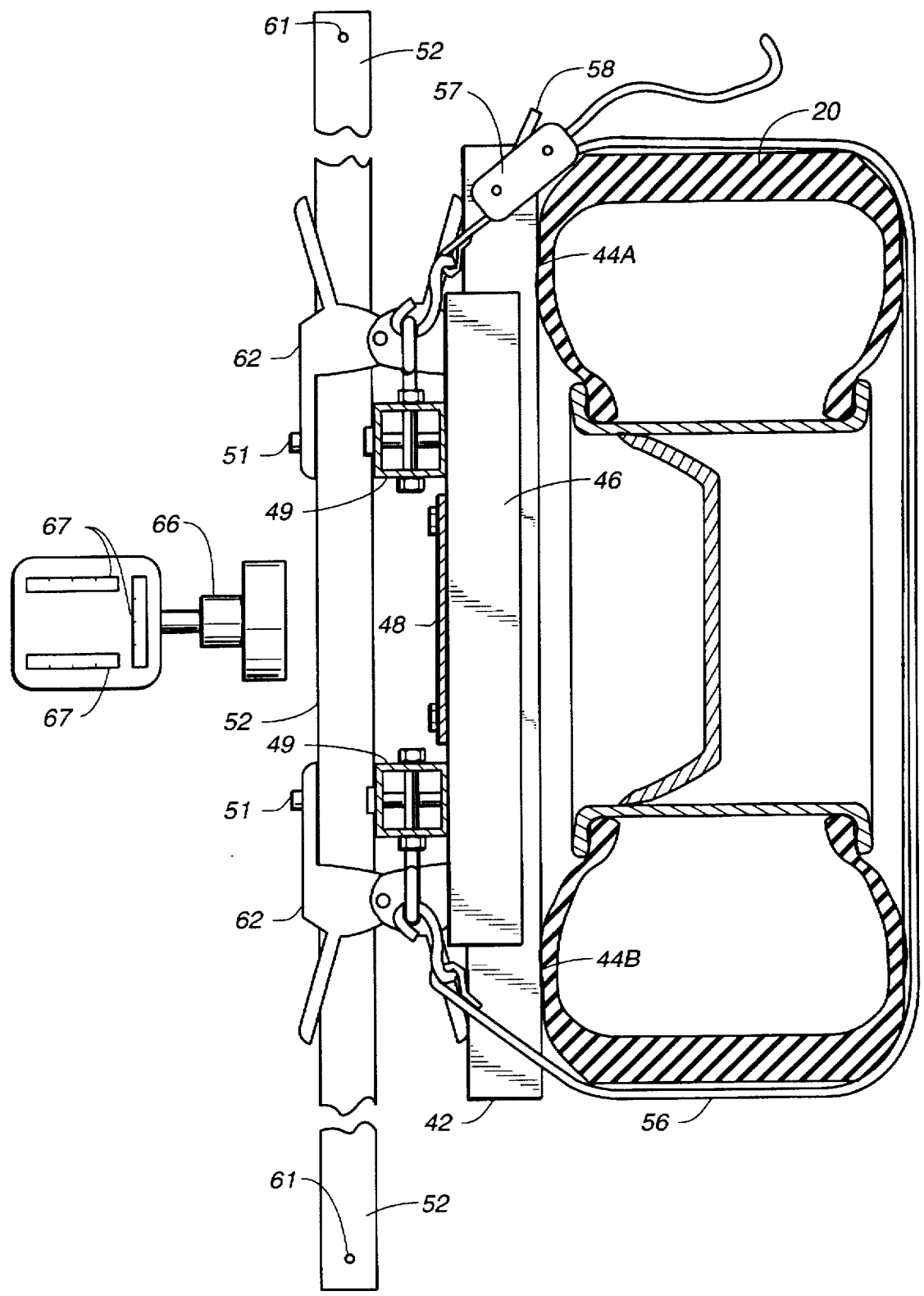
FIG._10

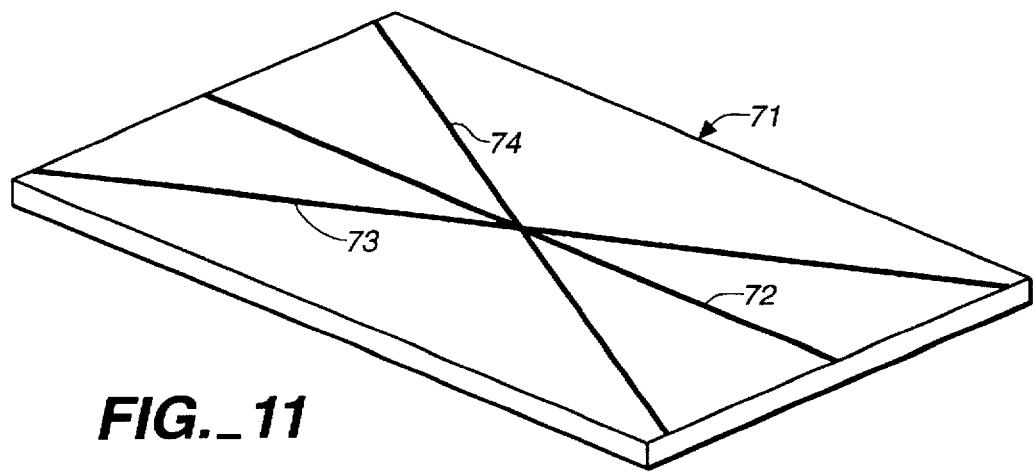
FIG._11
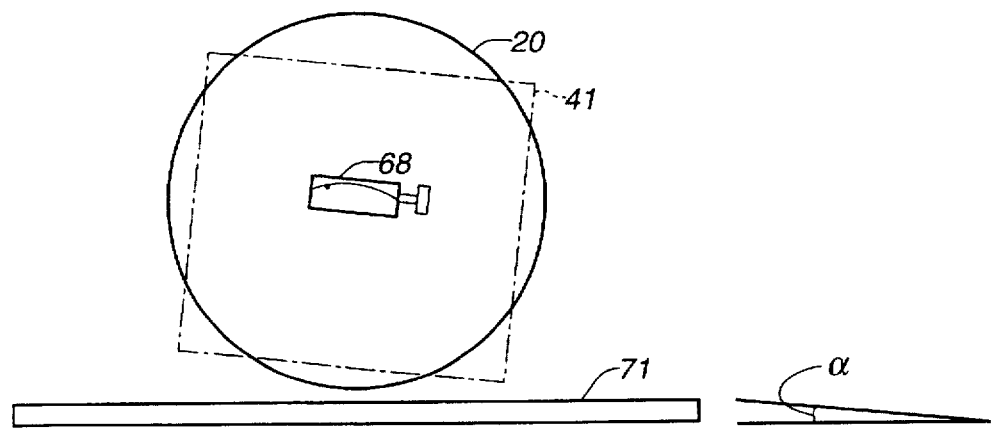
FIG._12
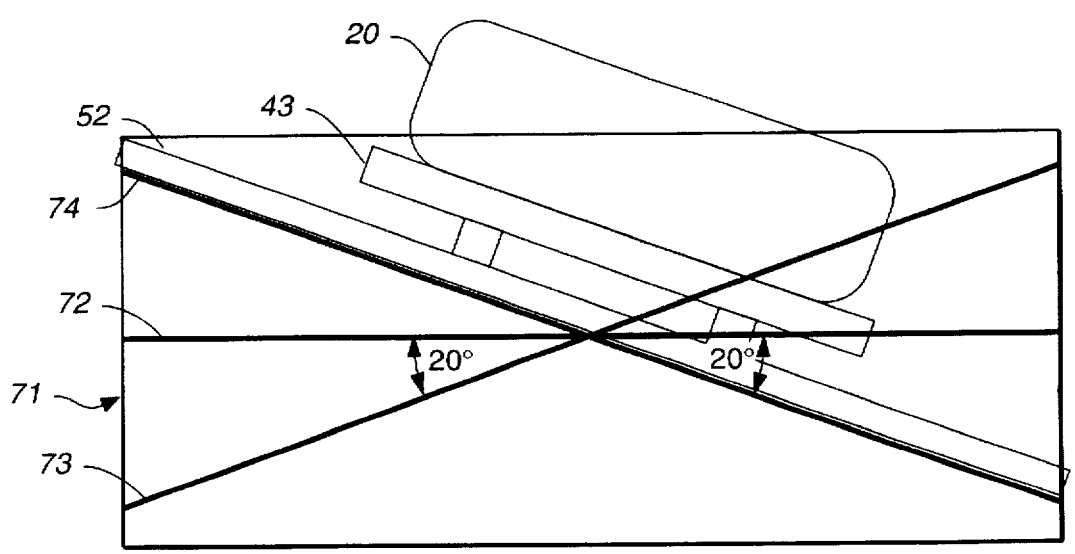
FIG._13

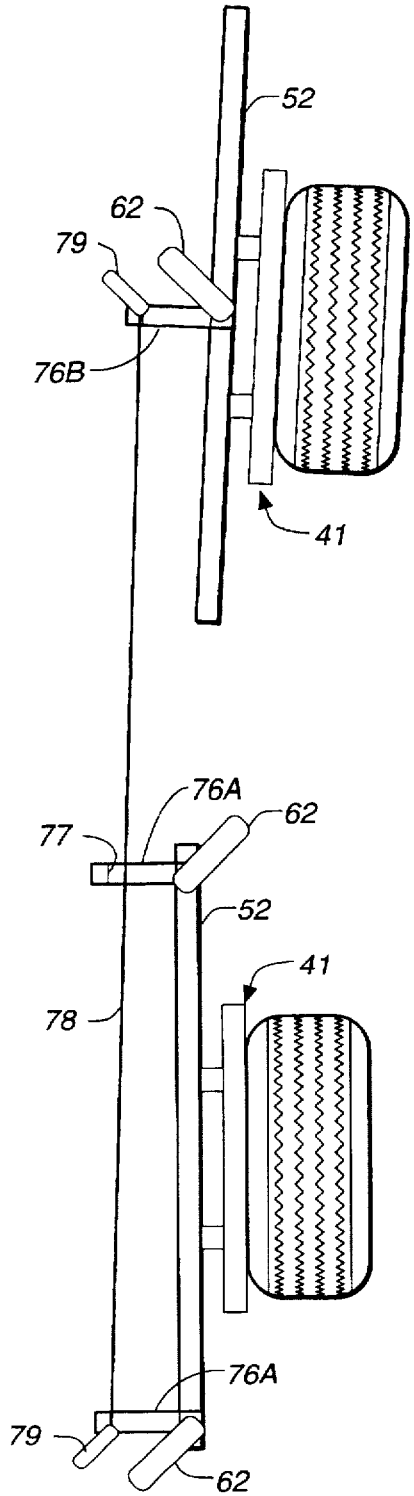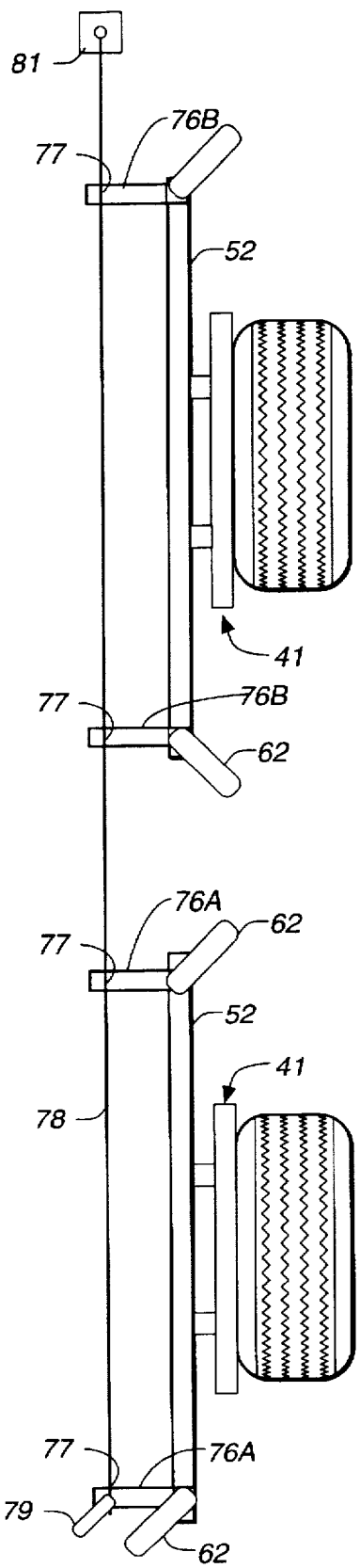
FIG._14A  FIG._14B

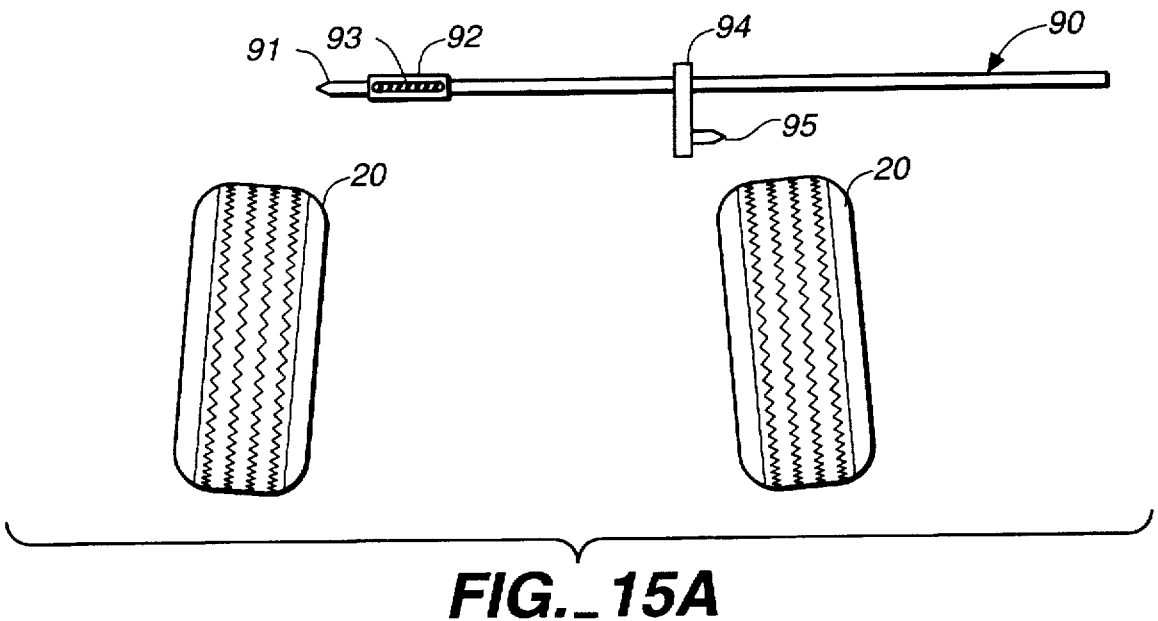
FIG._15A
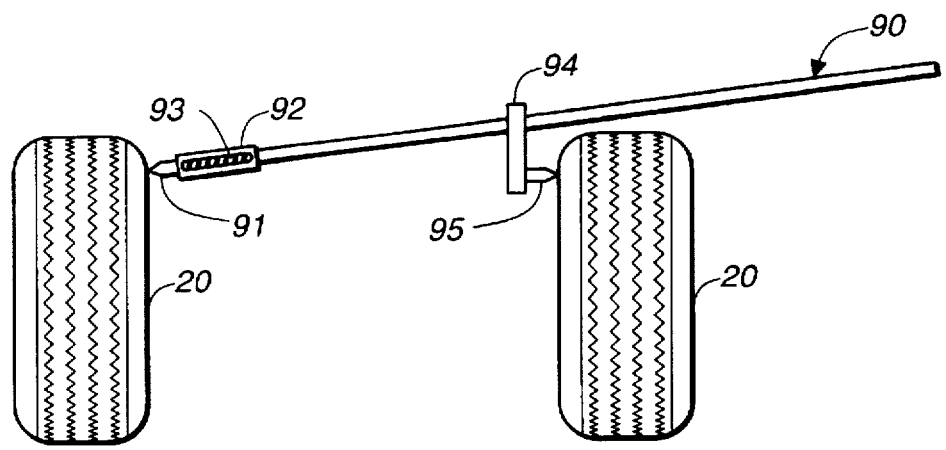
FIG._15B

WHEEL ALIGNMENT METHOD AND APPARATUS

BACKGROUND OF THE INVENTION

The present invention relates to systems for aligning the wheels of automotive vehicles.

Wheel alignment involves measuring various angles and adjusting various component parts to set the wheels at a prescribed orientation with respect to each other and with respect to the geometrical axes of the vehicle. Wheel alignment is important to assure safe handling of the vehicle particularly while turning and to assure even tire wear.

Prior art wheel alignment apparatus measures the necessary angles using gauges or special fixtures that mount directly on the wheel or on the wheel hub. The term "wheel" as used herein refers to the circular rim on which the tire is mounted, although in the vernacular it is sometimes used more generally to refer to the combination of the wheel with a tire mounted on it. The hub is the mounting piece on the vehicle to which the wheel is bolted. One common type of wheel fixture clamps onto the wheel at the outer edge of the rim and is arranged to establish a measurement plane that is ideally parallel to the center plane of the wheel. Angle-measuring gauges, or in some systems a laser for projecting an alignment beam, are mounted directly on the fixture and depend on the accuracy of the fixture's measurement plane for the reliability of their measurements. The placement of this type of fixture, however, is highly dependent on irregularities in the wheel. Dented or out-of-round wheels, for example, can distort the measurements and must be compensated for, if possible, before the fixture may be used reliably. Another type of wheel fixture connects instead to the wheel hub or central spindle and may also lock onto the wheel for added support. This type of fixture provides an alignment arm for making measurements that is in effect an extension of the spindle and thus is unaffected by imperfections in the wheel itself. To install this type of fixture, at the least a grease cap and/or bearing nut must be removed, and this can be annoying, time-consuming or at best inconvenient. In another approach an angle-measuring gauge is magnetically secured directly to the wheel hub. This is inconvenient, however, because the wheel typically has to be removed or special adaptor plates are attached to the hub. Nevertheless, despite the inconvenience or latent inaccuracies, prior art wheel alignment systems in common use find it necessary to rely on fixtures and/or gauges that attach, either directly or through adaptor plates, to the wheel and/or hub.

SUMMARY OF THE INVENTION

The present invention provides a new system for wheel alignment measurements that does not employ a fixture attaching to the wheel or to the wheel hub and that does not require removal of the wheel, grease cap, bearing nut or any other part of the wheel assembly or support structures. In a nutshell, the methods and apparatus of the invention use the sidewall of the tire to define the reference from which measurements are taken. This is accomplished by means of a specially formed wheel fixture that rests against the sidewall of the tire and is not clamped to the wheel as is the practice in prior art systems. Briefly, the wheel fixture includes a means defining a planar surface for engaging the sidewall of the tire and a base structure that slides back and forth on the sidewall-engaging means. The base structure includes a measurement surface that is parallel to the planar surface defined by the sidewall-engaging means and in turn is thus parallel to the sidewall when the fixture is mounted on the tire. The fixture is held in position against the sidewall by a flexible strap that is passed around the tire and attaches at opposite sides to the base structure. As the strap is drawn tight, the base structure automatically adjusts itself by sliding fore and aft on the sidewall-engaging means so as to avoid binding and to maintain the measurement surface in highly precise parallel relation to the sidewall.

The wheel fixture can be used for making a variety of wheel alignment measurements. In particular, a method is presented for measuring the caster and steering axis inclination (SAI) while the vehicle is jacked up so the wheel being measured is raised off the ground. The method calls for making false caster and SAI readings with the wheel in its raised position and then compensating for the false readings in accordance with other measurements as described herein, which may be easily and accurately accomplished with the wheel fixture of the present invention.

A simpler form of apparatus based on the same sidewall-engaging principle as the wheel fixture may be used for checking wheel straightness and for making toe measurements. The toe and straightness checking apparatus includes a cross member that has a straight portion sufficiently long at least to extend across the tire and engage the sidewall on opposite sides of the wheel. A pair of elongate parallel support members, provided for example by a pair of parallel rods, extend perpendicular to the cross member and rest with their ends on the ground during use. The cross member may be selectively positioned on the support members so that it engages the tire at a mid level. This extremely simple apparatus may be used to make a surprisingly fast and accurate test for wheel straightness and surprisingly fast and accurate toe measurements.

It is an advantage of the present invention that the measuring surface for all alignment measurements is a planar surface parallel to a plane through the center of the tire. The invention achieves this advantage by using the sidewall of the tire to define the measurement plane. Even if the wheel exhibits runout or dimensional inaccuracy, nevertheless because of the flexibility of the tire, the sidewall remains accurately parallel to the center plane of the tire. It is a further advantage of the invention that the wheel fixture is easier to install than those of the prior art. The measurement surface is quickly and easily established without having to remove the wheel or bearing nut or other components and without having to alignment the wheel fixture separately after it is installed on the tire.

Another advantage of the present invention is that the apparatus is simple to use, permits alignment measurements to be made comparatively quickly, and is of comparatively low cost to manufacture.

A new type of wheel spreader is also provided to assist eliminating play when making toe measurements. Briefly, the wheel spreader includes a long shaft, a comparatively short retractable tip for engaging a wall of a tire, and a spring arrangement at one end of the shaft for urging the tip to its extended position. The shaft carries a movable stop member that may be positioned at any point along the shaft, and the stop member carries a second tip pointing in the opposite direction of the retractable tip also for engaging an inner wall of a tire. The wheel spreader is long enough to reach from the inner wall of one tire across a typical wide vehicle and extend out beyond the opposite side of the vehicle. The wheel spreader is very quickly and conveniently installed extending the spreader across the vehicle to engage the inner wall of the far tire, spreading the wheels, and locking the spreader into position by setting the movable stop member against the inner wall of the near tire.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a perspective view of a short form of toe checking apparatus according to the invention in position against a tire as used to test the straightness of a wheel, with the vehicle body being shown in phantom.

FIG. 2 is a rear elevational view of a tire showing the manner of applying the apparatus of FIG. 1.

FIGS. 3A and 3B are plan views of the tire and apparatus of FIG. 2; in FIG. 3B the tire is rotated through 90 degrees relative to the tire of FIG. 3A.

FIG. 4 is a perspective view of a long form of toe checking apparatus according to the invention in toe-measuring position against a tire.

FIG. 4A is a perspective view of the toe-checking apparatus of FIG. 4 with additional spacer blocks.

FIG. 5 is a sectional view of a detail of the toe-checking apparatus along the line 5—5 of FIG. 4.

FIG. 6A is a diagrammatic plan view showing toe-checking apparatus in position at the front wheels for making toe measurements.

FIG. 6B is a diagrammatic plan view of toe-checking apparatus in position against the front wheels using spacer blocks.

FIG. 7 is a perspective view of a wheel fixture according to the invention mounted on a tire (shown in phantom).

FIG. 7A is an exploded perspective view of the wheel fixture of FIG. 7 with additional components used in combination with the wheel fixture.

FIG. 8 is a side elevational view of the wheel fixture of FIG. 7 mounted on a tire.

FIG. 9 is a front elevational view of the wheel fixture of FIG. 7 mounted on a tire.

FIG. 9A is a sectional view of a rail assembly along the line 9A—9A in FIG. 8.

FIG. 10 is a top plan view, partly in section, of the wheel fixture of FIG. 7 with utility bar in position on the wheel fixture.

FIG. 11 is a perspective view of an alignment pattern for use with the invention.

FIG. 12 is a diagrammatic view illustrating the measurement of the elevation angle of a vehicle that has been jacked up.

FIG. 13 is a plan view showing the use of the alignment pattern of FIG. 11 during caster and camber measurements.

FIGS. 14A and 14B are plan views illustrating methods of using the wheel fixture of the present invention in front-rear alignment measurements.

FIGS. 15A and 15B are plan views showing an anti-play wheel spreader before installation (FIG. 15A) and after installation in its wheel-spreading configuration (FIG. 15B).

DETAILED DESCRIPTION OF ILLUSTRATIVE EMBODIMENTS

An alignment apparatus and procedure according to the invention will first be illustrated with reference to FIGS. 1–5, which show an elementary embodiment of apparatus for determining the straightness or trueness of the wheels and for measuring toe-in or toe-out.

Preparatory to making any wheel alignment measurements on a vehicle, it is necessary first to assure that the wheels are straight as mounted on the vehicle, that is, the wheels are not deformed and they are not mounted on bent supporting structures. This can be accomplished swiftly and accurately with the apparatus depicted in FIG. 1. The apparatus comprises a cross member 11 provided in FIG. 1 by a straight hollow square rod with flat sides approximately 1.5 inch (3.8 cm) on a side and square cross section. Cross member 11 is supported on a pair of elongate parallel support members 12, which in FIG. 1 are in the form of straight rods of roughly ⅜-inch diameter (0.9525 cm) that extend perpendicular to cross member 11 and rest with their bottom ends 13 on the ground. Although straight rods are simple and convenient, support members 12 may assume other forms as well. Whatever form support members 12 may have, it is important for proper operation of the apparatus that bottom ends 13 be formed to permit a back-and-forth rocking contact with the ground or base on which they rest so that the apparatus may be rocked back and forth on the ends 13 in the course of making a toe measurement as described below.

Support members 12 are connected to cross member 11 by a means such as illustrated in FIG. 5 that permits a user to fix the cross member at a desired height on the support members. In the embodiment of FIG. 5 a metal sleeve 16 extends through cross member 11 at each end of the cross member. Sleeve 16 is of tubular shape and has a diameter sized to snugly receive rod 12 with as little lateral play as feasible, but still providing enough clearance that the rod may be slid through the sleeve. The ends of sleeve 16 protruding above and below cross member 11 are covered by a protective band 17, for example, of a pliant plastic or rubberized tubing material. Band 17 protects the ends of sleeve 16 from becoming nicked or dented, which could impede the sliding action of rod 12 in the sleeve. Band 16 may also serve to secure sleeve 16 in position in cross member 11. Cross member 11 is maintained in a selected position along support members 12 by a shaft collar 18 at the underside of the cross member. Although the shaft collars are illustrated here only at the underside of the cross member, a second shaft collar could also be used on each rod at the upper side of the cross member. Shaft collar 18 is held in position by thumb screw 19, which may be loosened and re-tightened to permit a user to slide the cross member and shaft collars up or down support members 12 to any selected position. As illustrated here the shaft collars 18 are secured to rods 12, and the cross member 11, more specifically the lower bands 17, simply rest on the shaft collars. Those skilled in the art will appreciate that a variety of other mechanical arrangements can also be used to secure the cross member in position at a desired height along rods 12. For purposes of the present invention it is only necessary that the particular clamping arrangement employed maintain the cross member in position on the support rods without slipping and that it permit the user to move the cross member to higher or lower positions on the support rods to accommodate larger or smaller tires.

The apparatus just described is used in the following manner to determine whether a wheel is straight. First, the vehicle is jacked up slightly to permit the user to rotate the wheels. Cross member 11 is then rested against tire 20 with the vertically extending support rods 12 standing approximately upright on the ground. (See the position 21 in FIG.

2.) The positioning of the cross member and vertical rods is adjusted until cross member 11 just contacts the sidewall 22 of tire 20 on opposite sides of the wheel at the positions indicated by reference numerals 23A and 23B in FIG. 1. The apparatus is then rocked away from tire 20 with the bottom ends 13 of support members 12 remaining fixed on the ground to the position 24 shown in phantom in FIG. 2. While holding the apparatus in its position 24 away from the wheel, the user manually rotates the wheel through an amount less than a full revolution, and then rocks the apparatus into a position of contact with the tire again, all the while keeping the support rod ends 13 at the same positions on the ground. If the wheel is straight to within commonly accepted tolerances, then cross member 11 will contact the sidewalls of tire 20 evenly on both sides. If not, then in the rotated position cross member 11 will contact the tire only on one side. FIGS. 3A and 3B show the resulting dispositions for a wheel that is not straight. FIG. 3A shows a top plan view of cross member 11 in initial contact with tire 20. In FIG. 3B tire 20 has been rotated through 90°, and cross member 11 now contacts tire 20 only at the position 23A. It is preferable to rotate tire 20 through 90° and 180° to assure for optimum detection of nontrue wheels. All four wheels are checked in this manner.

It should now be evident that at least one side of cross member 11 must be straight and even for engaging tire 20, and the cross member preferably has a length on the order of a diameter of tire 20. If the length is much shorter, then it will not be long enough to stretch between the opposite outwardly bulging sides of sidewall 22. If the length is much longer, then the cross member could interfere with the vehicle body on certain makes of vehicles in which the outer sidewalls of the tires do not protrude from the wheel wells beyond the body. Moreover, it is not necessary to position cross member 11 directly over the center of the wheel. In general it is desirable that cross member 11 be set at a height on support members 12 so that it contacts the tire sidewall at a position above the center point of the wheel so as to avoid interference from a possibly protruding bearing nut or protective cap.

Having confirmed that the wheels are straight, the user then continues with the alignment procedure. As is customary in wheel alignments, the vehicle is positioned on four wheel plates. Wheel plates consist of two parallel steel plates with an intermediate bearing support. The bottom plate rests on the ground, and the top plate can turn or slide on the supporting bearing. A representative wheel plate 26 is seen in FIG. 4 and in elevation in FIG. 9. Four wheel plates are set out in the approximate positions of the four wheels and are leveled side to side and front to back. If the degree of inclination from front to back is known, then it is not necessary to level the wheel plates front to back, although it is generally desirable to do so. Leveling is a known preparatory step and need not be described in detail here.

After the vehicle is positioned on the wheel plates, the next preparatory (and customary) step is to determine whether the centers of the two front wheels and of the two rear wheels are at the same height off the now level wheel plates. Opposite wheel centers side to side should be at the same height, although it is not necessary for the centers front to back to be at the same height. If the centers are not at the same height, then air is let out of a tire to lower one side and bring the centers to the same height.

The measurement of the toe-in or toe-out of the wheels is now described with reference to FIGS. 4, 4A, 6A and 6B. Toe-in refers to the disposition of a pair of tires (front or rear) in which the leading edges of the tires are closer together than the trailing edges. Toe-out refers to the reverse disposition, in which the trailing edges are closer together than the leading edges. Wheel toe may be measured with the same apparatus as used to check wheel straightness described with reference to FIG. 1. For greater accuracy and convenience, however, it is desirable that cross member 11 have a longer length than that shown in FIG. 1. The apparatus of FIG. 4, sometimes referred to herein as a toe checker or toe checking apparatus to reflect this function of the apparatus, has the same structure as the apparatus of FIG. 1 except that cross member 11 is longer. Notwithstanding the difference in length of the cross members, like components in the embodiments of FIGS. 1 and 4 are given like reference numerals.

To begin, the vehicle steering wheel is centered, and if necessary, a wheel spreader may placed between the wheels to remove any excess play in the steering linkage. A conventional wheel spreader may be used, but an improved wheel spreader for use with the present apparatus is shown in FIGS. 15A and 15B and is described below. The toe checker is positioned against one of the wheels as shown in FIG. 4 with cross member 11 contacting sidewall 22 of the tire at the positions 23A and 23B. The supporting rods 12 should be in a generally upright position although it is not necessary for them to be perfectly vertical. When cross member 11 is in the position in which it evenly contacts the tire sidewall at the two points opposite points 23A and 23B, the position of the supporting member ends 13 on the ground is marked. This may conveniently be accomplished by applying a small piece of masking tape 27 to the floor with an edge of the tape abutting each supporting member end 13. A line may also be drawn on the tape by the center of each supporting member end 13 to indicate the precise position of the end on the floor. The same process is repeated on the opposite side of the vehicle.

With the toe checking apparatus removed, the distances d1 and d2 between the two forward marks and between the two rear marks on opposite sides of the vehicle are measured. See FIG. 6A. The difference between the distances d1 and d2 characterizes the amount of toe in or toe out. The measured difference is related to the degrees of toe by a fixed trigonometric formula and the conversions may be provided, for example, in a conversion table. The toe checking apparatus is particularly convenient to use, however, if the distance labeled X in FIG. 6A between the two ends 13 of the supporting members is approximately equal to 57.29 inch (1.455 m) or to 28.64 inch (0.724 m). With a separation of 57.29 inch, one inch of measured difference between the lengths d1 and d2 will correspond to 1 degree of toe (in or out). This makes it easy to convert from the difference in measured distances d1 and d2 to degrees of toe. With the shorter separation of 28.64 inch, one-half inch of measured difference between the lengths d1 and d2 will correspond to 1 degree of toe (in or out). The longer cross member 11 is thus preferred because of its greater accuracy, but the shorter cross member may also be used.

With some vehicle styles a long cross member 11 such as shown in FIG. 4 cannot be placed directly against the tire sidewall because a portion of the vehicle body protrudes outward and interferes with the cross member. In such cases a pair of spacer members 31 can be used to space cross member 11 away from the tire sidewall so that the cross member contacts the tire sidewall through the spacer members. See FIGS. 4A and 6B. In FIGS. 6A and 6B the vehicle body 32 is depicted diagrammatically in phantom. In FIG. 6B the body would interfere with cross member 11 if not for spacer members 31. The spacer members are formed on one side to present a straight surface 33 to the tire sidewall and are formed on the other side with a channel 34 sized to receive cross member 11 and hold the spacer members in position on the cross member. Formed with a channel in this way, spacer members 31 may be slid along cross member 11 to line them up with the sidewalls of tires of different sizes. The spacer blocks are illustrated herein as generally rectangular blocks and may be referred to as blocks, although they may take forms other than the solid rectangular blocks illustrated here. While spacer elements may be constructed in a variety of ways, the important point is that the spacer elements leave cross member 11 parallel to the plane of the tire wall.

The toe checking apparatus described above is generally used when the only alignment parameter to be checked is the wheel toe. If a full alignment is to be performed, then the principles of the above toe checking apparatus may be incorporated into other apparatus that is used for making further wheel alignment measurements and that will now be described.

FIGS. 7–10 show a wheel fixture 41 that is used to define an operational measurement surface for use in making further measurements. Wheel fixture 41 includes a sidewall-engaging means to be placed in contact with the sidewall of tire 20 and a base structure 43 in laterally sliding engagement with the sidewall-engaging means for use in supporting various other components used in the course of making measurements. In the embodiment of FIG. 7 the sidewall-engaging means is provided by a pair of elongate horizontally extending, parallel sidewall members 42 conveniently provided in the form of slide channels having a flat face for engaging the sidewall. Sidewall members 42 extend across the tire, and each member contacts the sidewall at two points 44A and 44B on opposite sides of the wheel. The flat faces of slide channels 42 define a planar surface that is parallel to the sidewall of the tire. The sidewall, in turn, is precisely parallel to the center plane of the tire and wheel, indicated by reference characters CP in FIGS. 2, 3A and 3B. The plane of the sidewall thus represents the plane of the wheel and is defined without reference to the wheel, hub, spindle or any other supporting structure in any way. The plane of the sidewall is the plane with respect to which the further alignment measurements are taken. Sidewall members 42 are mounted on base structure 43 so as to slide laterally. In the embodiment of FIG. 7 base structure 43 includes a pair of slide channels 46 that interlock with the pair of slide channels 42 so as to slide freely within one another without binding. To assure that the interlocking channel members slide without binding, at least one of each pair of interlocking channel members is provided with a low friction surface for engaging the other. In FIGS. 9 and 9A a layer 47 of ultra-high molecular weight plastic having especially low friction is formed on the inner face of channel members 46 forming a part of the base structure. Such plastics are well known and need not be described in detail here. The low-friction plastic need only be applied to reduce the friction between the inner face of member 47 and the edges of member 42 as this is the contact that is squeezed together when fixture 41 is mounted on a wheel. The opposing sliding side faces of the members 42 and 47 do not bear excessive weight and need only have sufficient clearance, shown exaggerated in FIGS. 9 and 9A for visibility, to permit the two members to slide freely within one another. It is to be noted that sidewall-engaging channel members 42 are separate from base structure 43 because several lengths of channel member (designated with reference numerals 42A and 42B in FIG. 7A) will generally be needed to accommodate different sized wheels and wheel wells.

Base structure 43 also includes a flat plate 48 that is secured, e.g., with bolts to the back sides of cross members 46. Plate 48 defines a measuring surface that is parallel to the flat surfaces of sidewall members 42 and hence parallel to the tire sidewall and wheel center plane CP. Plate 48 is preferably formed of steel or other magnetically responsive material so that it will hold a magnetic gauge for measuring caster and camber to be discussed below. Base structure 43 further includes two elongate vertical members 49 on opposite sides of plate 48 that are secured to cross members 46. In the embodiment of FIG. 7 vertical members 49 are provided by aluminum square tubing 1.5 inch (3.8 cm) on a side. Protruding from the ends of vertical members 49 are side-by-side pins 51. The pins 51 and vertical members 49 are used to assist in mounting a straight elongate, generally horizontal, rail member 52 on the base structure. Rail member 52 serves to define a reference line that is used in the course of making caster and toe measurements and other measurements as will be described further below and serves other purposes as well. To reflect its various uses, rail member 52 is sometimes referred to as an alignment bar or a toe bar. In making these measurements it is important that rail member 52 be parallel to plate 48 and hence parallel to the tire sidewall. The front faces 53 of vertical members 49 serve as a positioning surface parallel to plate 48. A rail member 52 placed on pins 51 against front faces 53 will be held in an approximately horizontal position parallel to measuring plate 48 and hence parallel to the sidewall. Vertical members 49 extend downward a sufficient length so that when the fixture is mounted on a tire, pins 51 will be located lower than the bottom extremity of the vehicle body. In this way when rail member 52 is positioned on pins 51 and the wheel is turned in and out in the course of making measurements as described below, the vehicle body will not impede the movement of the rail member.

Wheel fixture 41 includes a flexible strap 56 for attaching the fixture to the sidewall. The fixture is placed against the sidewall and strap 56 is run laterally behind and around the tire. Strap 56 is removably connected to base structure 43 at one side by a releasable clasp 57, which preferably includes a tightening mechanism such as a ratcheting mechanism operated by ratchet arm 58 to help in drawing strap 56 tight. As the strap is drawn tight, sidewall members 42 are pulled into engagement with the tire sidewall and channel members 46 slide against the interlocking sidewall members 42 without binding and bring equal pressure to bear on all points of contact with the sidewall. With prior art wheel alignment fixtures a problem sometimes arises in clamping the wheel fixture to the wheel because some wheel rims do not present enough of a lip for the clamping member to grasp. This problem does not arise with the present invention, which does not clamp on to the wheel or wheel rim at all, but is held in position by the strap extending around the back of the wheel. Measuring plate 48 will be maintained precisely parallel to the flat sidewall-engaging sides of members 42 and hence parallel to the sidewall and parallel to the center plane of the wheel, which ideally serves as a reference plane for the alignment. Although a common nylon webbing strap is illustrated here, other flexible arrangements could be used to secure the wheel fixture to the tire such as chains or other webbing arrangements. As used herein the term "strap" is intended to refer to such other flexible arrangements as well as common fabric or plastic straps.

It is a point of distinction of the present invention that wheel fixture 41 defines a measuring surface with respect to the sidewall of the tire, which in turn is parallel to the center plane of the wheel. This is accomplished through the combination of the strap around the back of the wheel and the sliding channel members which allow the fixture to adjust itself laterally so that an equal pressure is maintained at all points and binding is avoided, which would otherwise tend to give a distorted reference plane. For the fixture to define the reference plane accurately and reliably, the fixture must be dimensionally stable. In the embodiment illustrated here the wheel fixture is bolted together. Structural adhesives or any other dimensionally stable means of securement may also be used. Caution must be used in welding, however, because the various component parts may not be dimensionally stable under the heat of welding and this can lead to a lack of sufficient parallelism.

Procedures will now be described for making various alignment measurements using wheel fixture 41. To measure the toe-in or toe-out, a wheel fixture 41 is mounted on each of the front wheels and a toe bar 52 is mounted on each wheel fixture on pins 51. As in the toe measurement procedure described above using the toe checking apparatus of FIG. 4, the steering wheel is first centered and a wheel spreader may be placed in position to take the play out of the steering linkage. Toe bar 52 includes two vertical alignment pins 61, one at each end of the bar. Alignment pins 61 are spaced apart by a known distance. As above, the toe bar will be particularly convenient to use if the distance between the two alignment pins 61 is equal to 57.29 inch (1.455 m). This will make it easy to convert from differences in measured distances to degrees of toe. Toe bar 52 is set on the two alignment pins 61 and is clamped in position. Although a variety of clamping methods may be used to secure bar 52 in position during measurement, it is advantageous for practical reasons to use spring clamps 62. With spring clamps the user can clamp and unclamp the toe bar and make minor adjustments in position very quickly and easily.

At this stage the amount of toe can be measured. The distance is measured from side to side at the front and at the rear of the two toe bars at the alignment pins 61. This is the same procedure as described above, except that it is not necessary to make a mark on the ground and measure between marks. The measurements may now be made directly between alignment pins from one toe bar to the other. This arrangement has the advantage that the measurements may be conveniently made by a single person. The user simply places a straight rule on the toe bars that is long enough to reach across the vehicle from toe bar to toe bar. The zero position on the rule is lined up with one of the pins 61 and the distance is read at the opposite pin 61. This measurement is performed at the front two pins and at the rear two pins of the toe bars 52. Alternatively, the user may simply extend a tape measure and hook the end of the tape measure over one toe bar at the position of a front or rear pin 61 and measure the distance to the opposite toe bar at the corresponding front or rear pin 61.

Other wheel alignment measurements—caster, camber, steering axis inclination (SAI) and included angle—are made with a magnetic alignment gauge 66 in the manner now to be described. The magnetic alignment gauge is a commercially available type of gauge commonly used in prior art wheel alignment systems. It is so called because it is magnetically attachable to a wheel hub or to an adaptor plate or to a special steel plate clamped onto the wheel for receiving the gauge. The gauge typically includes several gradated bubble gauges 67 that are appropriately oriented on the gauge for indicating the desired angles when the gauge is mounted on the wheel hub or wheel plate. As used in prior art systems, however, the gauge suffers from the disadvantages that the wheel must be removed or a bearing nut must be taken off to gain access to the wheel hub, or the special plate must be secured typically to the rim and itself aligned with a reference plane. These disadvantages are avoided in the present invention. The alignment gauge is simply placed against measuring plate 48 of wheel fixture 41 and magnetically held there. Plate 48 defines the operational measuring surface from which measurements are made and, as described above, that measuring surface is parallel to the sidewall and hence to the center plane of the tire.

One of the alignment measurements made with gauge 66 is the camber of the wheel. Camber is the tilt of the top of the wheel inward (negative camber) or outward (positive camber) with respect to a vertical reference line. In the present invention magnetic alignment gauge 66 is adhered to measurement plate 48 and the wheel camber is read from the gauge in the conventional manner. The principal advantage of the present invention in measuring camber is the speed and ease with which wheel fixture 41 is secured to the tire, the resulting speed and ease with which this establishes an operational measuring surface on which to place gauge 66, and the accuracy of the measuring surface established. Once the wheel fixture is secured on the tire and the gauge placed on plate 48, the camber measurement proceeds in the conventional way, which need not be elucidated further here.

The procedures for measuring caster and steering axis inclination (SAI) will now be described. Caster and SAI are well known terms describing the orientation of a wheel's steering axis. Generally speaking, the steering axis is the axis about which the wheel pivots when the steering wheel is turned, and it is established by the arrangement of ball joints, kingpin or the like that enables the wheel to be steered. Caster refers to the forward or rearward tilt of the steering axis measured with respect to a vertical reference line when the vehicle is on a level surface. SAI refers to the inward or outward tilt of the steering axis with respect to the vertical reference line. To obtain proper caster and SAI measurements, it is important that the vehicle either be on a level surface from front to back, or if not level, then the inclination of the surface must be known so that the measurements may be adjusted to compensate. The inclination of the ground surface is generally known in advance, or if it is not known, it is determined as a preliminary step when the wheel plates are set out, as mentioned above.

To measure the caster, a level gauge 68 is first clamped to a vertical member 49 of the wheel fixture. A common bubble level gauge may be used for this purpose. Such gauges typically have an adjustment for leveling themselves or setting the gauge to a zero reading. As a practical matter, it is most expedient to put wheel fixtures on the two front wheels at the same time and place level gauges on each of the wheel fixtures. In the course of the procedure the front of the vehicle is jacked up, and the vehicle may move slightly from side to side if the jack is not perfectly centered. Thus, the level gauges on the two front wheels may give slightly different angles of inclination when the vehicle is in its elevated position. When the vehicle is jacked up, the angular change a in the fore and aft inclination of the vehicle at each wheel can be measured separately on level gauge 68 as shown diagrammatically in FIG. 12.

First the brakes are clamped so that the front wheels will not turn. This may be accomplished in known manner by inserting a standard brake depressor in the vehicle to hold the brake pedal in its fully depressed position. With the present procedure as with conventional caster measurement procedures, the slightest rotation of the wheels can throw off the caster measurement. The vehicle is now jacked up to raise the front wheels slightly off the ground.

An alignment degree plate 71 (see FIGS. 11 and 13.) is then placed under each wheel. Alignment degree plate 71 is preferably a flat plate with at least three markings on it. A first straight line marking 72 serves as a central reference line. A second straight line marking 73 is at a pre-set angle to line 72. The selection of pre-set angle depends on the particular caster gauge used. Magnetic caster gauges are typically designed to be used with a wheel that is turned in and out by 20°, and for this reason a pre-set angle of 20° is illustrated here. Other gauges designed to use other reference angles will use a different pre-set angle, although as a practical matter the pre-set angle will generally fall in the range of 10° to 30°. A third straight line marking 74 is at the same pre-set angle to line 72, but to the opposite side of line 72. Alignment degree plate 71 is placed under each wheel with the central line 72 running generally fore and aft. For good viewability the plate and markings preferably extend at least the length of the projection of the tire on the ground and preferably somewhat more. The wheel is then turned manually until alignment bar 52 resting on pins 51 lines up with the center line 72 on the marking plate. At this stage an initial measurement is made of the angle of elevation α on level gauge 68.

Now the wheel is turned manually so that it points inward by the pre-set angle (20 degrees) of the lines on alignment degree plate 71. This is accomplished by turning the wheel until the alignment bar 52 lines up with line 73 on the marking plate. Magnetic alignment gauge 66 is placed on measuring plate 48. A conventional alignment gauge 66 includes a caster gauge, which may be set to read an initial zero degrees at this point. The wheel is then turned until it points outward by the pre-set (20 degree) angle by turning the wheel until alignment bar 52 lines up with the outward line 74 on the marking plate as shown in FIG. 13. The caster reading on gauge 66 is then noted. This is a false caster reading that must be corrected to give the true caster of the wheel. One correction is for the fore and aft slope of the ground, if any, noted when the wheel plates were first set up. There may not be any such correction, of course, if the alignment is performed on level ground. Another correction is for the fore and aft angular tilt (the angle a in FIG. 12) produced by jacking up the vehicle and any consequent movement of the vehicle suspension. This angle may be read from the level gauge 68 on the wheel whose caster is being measured, and as noted above, may be different for the two wheels if the vehicle is not evenly balance on the jack.

Caster measurements made in the prior art also compare readings on the caster gauge with the wheel turned inward 20 degrees and outward 20 degrees. With known wheel alignment equipment this is accomplished by turning the wheel as it rests on the turn plate. The typical turn plate has the degree markings on the plate itself, which indicate when the wheel is turned inward or outward the required amount. In practice, the weight of the car on the turn plates tends to center the wheel to a straight-ahead position. Another problem is that because of the large amount of caster that is put into newer vehicles, the wheel does not just pivot on a single point. Instead it moves fore and aft as well. This tends to pull the turn plate fore and aft, which tends to distort the readings at the wheel plate. In addition, with this arrangement it is usually difficult to turn the wheel by manually grasping the wheel itself. It often requires two people, one to turn the steering wheel and another to check the degree reading on the wheel plate. Thus, it is difficult for a single person to turn the wheel and get an accurate reading. The caster measurement method of the present invention avoids all of these problems of the prior art procedure and enables accurate caster measurements to be made by a single operator.

The SAI measurement can be made as with the caster angle by reading a different scale 67 on alignment gauge 66 that is oriented at 90° to the caster scale. Here, however, the angle generally referred to as the included angle must be taken into account. As is well known, the included angle is the angle between the steering axis line and the plane of the wheel, that is, the plane of measurement plate 48. The included angle is the SAI angle plus (or minus for negative camber) the camber angle.

To measure the SAI angle, turn the wheel once again so that it lines up with center line 72 on alignment degree plate 71, and place magnetic alignment gauge 66 on measurement plate 48. The indication on the camber scale of the alignment gauge is noted. This is a false camber reading that will be used for correcting the SAI reading. Then turn the wheel inward so that alignment bar 52 lines up with inwardly pointing line 73 on alignment degree plate 71 and note the SAI measurement, which can be set at a convenient beginning point on the bubble scale. Now turn the wheel outward 20 degrees by lining alignment bar 52 up with line 74 on the alignment degree plate, and note the change in the SAI reading. This is a false SAI reading, however, because the vehicle is not necessarily level from side to side when jacked up. It must be corrected by the false camber reading just made when the car was jacked up and the wheel was turned to point straight ahead. Combining the false SAI and false camber readings (with the positive or negative signs taken into account) yields the true included angle. The true camber has already been measured and so may simply be subtracted out of (or added into) the included angle to give the true SAI.

Wheel fixtures 41 are also conveniently used in detecting and measuring misalignments between the front and rear wheels and in aligning front and rear wheels with each other. As an example, FIG. 14A shows the detection and measurement of a nonzero thrust angle. This condition arises when the rear wheels do not follow in the tracks of properly aligned front wheels, but instead tend to go in a direction, generally referred to as the thrust line, that is different from the centerline of the vehicle. Thrust angle measurement is performed using measurement strips 76. As shown in FIGS. 7A, 14A and 14B, these are flat and narrow strips about 12 inches (30.5 cm) long including two marks 77 offset from the ends of the strips and separated by a prescribed distance typically 6 to 8 inches. The measurement strips may of course include more than two marks 77 and may be marked off in inches or other scale A wheel fixture is placed on the front and rear wheels on one side of the vehicle and an alignment bar 52 is clamped in position on each wheel fixture using spring clamps 62. Measurement strips 76A are clamped to the rear alignment bar 52 at the position of the front and rear pins 61. As seen in FIG. 14A a single strip 76B is clamped to the front alignment bar 52 at the approximate midpoint of the wheel. The strips 76A and 76B are most conveniently clamped to bar 52 by spring clamps 62. The strips are clamped to alignment bar 52 with the inner mark 77 lined up with the bar so that the outer mark 77 will be equally spaced from alignment bar 52 on all wheel fixtures. Strip 76B is positioned at the approximate midpoint of the front wheel so that a slight turn to the front wheel will have negligible effect on the measurement. A string line 78 is then stretched between the rear strip on the rear wheel and the center strip at the front wheel and clamped to these strips at the outer marks 77 with a small spring clamp 79. If the rear wheel tracks the front wheel, then string line 78 cross the forward strip 76A of the rear wheel at the outer mark 77. The deviation of the string line from the outer mark 77 provides a measure of the amount of the thrust line misalignment.

FIG. 14B shows a method of using the apparatus to relate the toe in of the front wheels with the rear wheels. Strips 76A are clamped to a toe bar 52 on the rear wheel fixture and strips 76B are clamped to an toe bar 52 on the front wheel fixture. Stringline 78 is clamped at one end to the rearmost strip 76A and at the other end to a post 81 at the front of the vehicle. Post 81 is positioned so that stringline 78 overlies the outer mark 77 on the forward strip 76A on the rear wheel fixture. In this configuration stringline 78 is parallel to the center plane of the rear tire and may be used as a reference for the front wheel toe. With the steering wheel centered, one can readily determine (or set) the toe of the corresponding front wheel relative to the rear wheel. If the stringline passes over both strips 76B the same distance out from the front toe bar 52, the front wheel has precisely the same toe as the corresponding rear wheel. Should the specified toe for the front wheels be different from that of the rear wheels, it is now a simple adjustment, using stringline 78 as a reference, to give the front wheel the proper toe.

As indicated above, in making alignment measurements it is sometimes desirable or necessary to get rid of the play in the wheels due to worn steering linkage or the like. FIGS. 15A and 15B show an improved wheel spreader for use with the present apparatus. Typical wheel spreaders of the prior art include a telescoped spring-loaded tube that is inserted between opposite tires with opposite ends of the tube pressing outward against the inner walls of the tires. In this configuration the spring is compressed, which causes an outward force to be exerted on the tires. Wheel spreaders of the prior art are disadvantageous in that it is generally necessary to crawl under the vehicle to install the wheel spreaders. In addition, several lengths of wheel spreaders must be kept on hand for use with vehicles of different sizes, or alternatively the wheel spreader must include a mechanical arrangement for adjusting the overall length of the spreader.

The wheel spreader of the present invention avoids these problems. It includes a shaft 90, which may be a solid shaft and need not be telescoping as in the prior art. The wheel spreader has a tip 91 at one end formed with a contact point, which is preferably in the shape of a blunt point for engaging the wall of a tire without damage to the tire. Tip 91 is spring biased so that it exerts a force against the tire wall. In the embodiment of FIGS. 15A and 15B a spring housing 92 containing a compression spring 93 is fixed to the main shaft 90. Tip 91 is mounted to retract into housing 92 and in its normal configuration is urged to its fully extended position by spring 93. A movable stop member 94 is mounted on shaft 90 that may be positioned at any point along the shaft. Stop member 94 may be conveniently provided by a form of stop member often used on brake depressors, which comprises a metal plate with a hole having a diameter slightly larger than the diameter of shaft 90 so that the plate may be slid along the shaft to a desired position and then will bind against the shaft when a sideways force is exerted on the plate. Stop member 94 carries a tip 95 pointing in the opposite direction of tip 91 for engaging an inner wall of a tire. Shaft 90 has sufficient length that the wheel spreader will reach from the inner wall of one tire across the vehicle and extend out beyond the opposite side of the vehicle. Although this wheel spreader is very simple, it is much more convenient and economical to use than wheel spreaders of the prior art. The user merely kneels by the side of the vehicle, reaches across the vehicle with the wheel spreader until tip 91 engages the inner wall of the far tire, pushes on shaft 90 and the near tire to spread the wheels, and adjusts stop member 94 to hold the wheels in their spread position as shown in FIG. 15B. It is not necessary to crawl under the vehicle, nor is it necessary to make any preliminary adjustment of the overall length of the shaft or to maintain a number of wheel spreaders of different sizes for different sized vehicles.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

What is claimed is:

1. A wheel fixture for use in combination with a tire mounted on a vehicle in aligning the wheels of the vehicle, comprising:

a sidewall engaging means defining a first planar surface for engaging a sidewall of the tire;

a base structure in laterally sliding engagement with said sidewall engaging means and defining a planar measurement surface parallel to said first planar surface;

a strap secured to said base structure at a first side thereof, said strap having sufficient length to extend laterally around the tire for securing the wheel fixture in engagement with a sidewall of the tire; and a clasp secured to said base structure at a second side thereof for fastening said strap to said base structure at said second side so as to secure the wheel fixture in position against the tire;

whereby said planar measurement surface is parallel to the sidewall of the tire when the wheel fixture is strapped to the tire.

2. The apparatus of claim 1 wherein said sidewall engaging means comprises:

first and second elongate parallel sidewall members, each having a flat side and together defining said first planar surface for engaging the sidewall, said sidewall members being disposed in sliding relation on said base structure to extend generally horizontally across the tire when the wheel fixture is in position strapped to the tire.

3. The apparatus of claim 2 wherein said first and second sidewall members each comprise elongate channel members, and said base structure comprises third and forth channel members interlocking with said first and second sidewall members, respectively for sliding engagement.

4. The apparatus of claim 1, further comprising:

a straight elongate rail member defining a straight laterally extending reference line parallel to said planar measurement surface.

5. The apparatus of claim 4 further comprising:

mounting means for removably mounting said rail member on said base structure, whereby said rail member may be mounted on and demounted from said base structure as needed.

6. The apparatus of claim 5 wherein said rail member further comprises first and second stops at opposite ends of said rail member spaced apart a prescribed distance for use in making measurements from said stops.

7. The apparatus of claim 6 wherein said first and second stops are spaced apart by 57.29 inch (1.455 m) for use in making toe measurements.

8. The apparatus of claim 5 wherein said base structure defines a positioning surface parallel to said planar measurement surface, and said mounting means comprises first and second side by side pins extending from said positioning surface for holding said rail member in position at said positioning surface.

9. The apparatus of claim 8 wherein said base structure further comprises first and second elongate vertical members on opposite sides of said planar measurement surface, said vertical members having flat faces defining said positioning surface.

\* \* \* \* \*